United States Patent
Asthana

(10) Patent No.: US 10,604,650 B2
(45) Date of Patent: Mar. 31, 2020

(54) FOAMED POLYCARBONATE ARTICLES WITH IMPROVED IMPACT AND METHODS OF MAKING AND USES THEREOF

(71) Applicant: SABIC Global Technologies B.V., Bergen op Zoom (NL)

(72) Inventor: Himanshu Asthana, Evansville, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/546,822

(22) PCT Filed: Jan. 29, 2016

(86) PCT No.: PCT/US2016/015554
§ 371 (c)(1),
(2) Date: Jul. 27, 2017

(87) PCT Pub. No.: WO2016/123437
PCT Pub. Date: Aug. 4, 2016

(65) Prior Publication Data
US 2018/0009981 A1   Jan. 11, 2018

Related U.S. Application Data

(60) Provisional application No. 62/110,206, filed on Jan. 30, 2015.

(51) Int. Cl.
| | | |
|---|---|---|
| *C08L 69/00* | (2006.01) | |
| *C08J 9/04* | (2006.01) | |
| *C08L 83/10* | (2006.01) | |
| *C08G 77/448* | (2006.01) | |

(52) U.S. Cl.
CPC ............. *C08L 69/00* (2013.01); *C08J 9/04* (2013.01); *C08L 83/10* (2013.01); *C08G 77/448* (2013.01); *C08L 2201/02* (2013.01); *C08L 2203/14* (2013.01); *C08L 2205/025* (2013.01); *C08L 2666/14* (2013.01)

(58) Field of Classification Search
None
See application file for complete search history.

(56) References Cited

U.S. PATENT DOCUMENTS

| 4,616,042 | A | 10/1986 | Avakian | |
|---|---|---|---|---|
| 2007/0060716 | A1* | 3/2007 | Ambravaneswaran | ...................... C08L 69/00 525/464 |
| 2008/0004397 | A1* | 1/2008 | An | .......................... C08L 69/00 525/67 |
| 2008/0015289 | A1 | 1/2008 | Siripurapu | |
| 2008/0015291 | A1 | 1/2008 | Siripurapu | |
| 2012/0248382 | A1* | 10/2012 | van de Wetering | .... C08L 23/28 252/506 |
| 2013/0085240 | A1 | 4/2013 | Sybert et al. | |
| 2014/0275368 | A1 | 9/2014 | He et al. | |
| 2014/0371360 | A1 | 12/2014 | Zheng et al. | |
| 2015/0357095 | A1* | 12/2015 | Siripurapu | ............. H01B 11/04 174/99 R |

FOREIGN PATENT DOCUMENTS

| EP | 2660290 | A2 | | 11/2013 |
|---|---|---|---|---|
| GB | 1443549 | A | | 7/1976 |
| JP | 3033153 | A | | 2/1991 |
| JP | 2014159510 | | * | 9/2014 |
| KR | 10-2013-0121121 | | | 11/2013 |

OTHER PUBLICATIONS

Van Ruymbeke, Determination of the Molecular Weight Distribution of Entangled Linear Polymers . . . Journal of Non-Newtonian Fluid Mechanics 105 (2002) pp. 153-175. (Year: 2002).*
Stokes, Local Stiffness-Density Correlations for Polycarbonate Strucural Foams, Journal of Materials Science 35 (2000) pp. 150-178. (Year: 2000).*
Levchick, Overview of Recent Developments in the Flame Retardancy of Polycarbonates; Polymer International 54 (2005) pp. 981-998 (Year: 2005).*

* cited by examiner

*Primary Examiner* — David J Buttner
(74) *Attorney, Agent, or Firm* — Cantor Colburn LLP

(57) ABSTRACT

A foamed article includes from about 80 wt. % to about 95 wt. % of a polycarbonate base resin including a first polycarbonate and a second polycarbonate, from about 3 wt. % to about 16 wt. % of a polysiloxane-polycarbonate copolymer, from about 0.01 wt. % to about 1 wt. % of a non-bromine flame retardant, from about 0.1 wt. % to about 10 wt. % of filler, and from about 0.01 wt. % to about 1 wt. % of a mold release agent. The foamed article exhibits a V0 rating at 3 mm measured according to UL 94. The foamed article exhibits improved multi-axial impact strength and can be employed in applications requiring impact strength and flame performance.

6 Claims, 4 Drawing Sheets

FOAMED POLYCARBONATE ARTICLES WITH IMPROVED IMPACT AND METHODS OF MAKING AND USES THEREOF

CROSS-REFERENCE TO RELATED APPLICATIONS

This application is the National Stage of International Application No. PCT/US2016/015554, filed Jan. 29, 2016, which claims the benefit of U.S. Provisional Application No. 62/110,206, filed Jan. 30, 2015, the disclosures of which are incorporated herein by reference in their entireties.

RELATED APPLICATION

The present application claims priority to United States patent application 62/110,206, filed Jan. 30, 2015, the entirety of which application is incorporated herein by reference for any and all purposes.

TECHNICAL FIELD

The present disclosure concerns foamed polycarbonate compositions with improved mechanical properties and the articles composed thereof.

BACKGROUND

Foams can be described as low or high density, porous materials. Polymer foams generally refer to foams with a two-phase gas-solid system having a continuous polymer matrix and gaseous cells dispersed throughout. These foams are often produced in pellet form for ease of manufacture and later provision to customers. The pellets, including the polymer matrix resin and a blowing agent, can be processed through a variety of methods including extrusion, compression molding, reaction injection molding, solid state methods, or injection molding, etc., to provide a foamed material. These polymeric foams are used to meet an array of needs such as thermal and impact insulation. The foams can also find use in structural applications requiring shape retention or load bearing and in packaging and automotive applications requiring optimal impact resilience.

SUMMARY

There is an ongoing need for foamed materials that can maintain structural soundness and optimal physical properties across a broad span of environmental demands. The disclosed foamed polycarbonate compositions comprise foams with improved mechanical properties to resolve these and other needs.

In an aspect, the present disclosure relates to methods of preparing foamed thermoplastic compositions having improved multi-axial strength and ductility when processed with an appropriate foaming agent. Flame retardant additives can also be introduced into the compositions to improve flame retardance.

In a further aspect, the disclosed compositions can comprise a polysiloxane-polycarbonate copolymer to enhance the mechanical and physical properties of a foamed polycarbonate.

In an aspect, the present disclosure relates to articles comprising the disclosed foamed thermoplastic compositions. For example, the present disclosure relates to polycarbonate foams for automotive, structural, and insulation applications.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

BRIEF DESCRIPTION OF THE DRAWINGS

The accompanying drawings, which are incorporated in and constitute a part of this specification, illustrate exemplary aspects and together with the description, serve to explain the principles of the compositions, methods and systems disclosed herein.

DETAILED DESCRIPTION

Figure 1:
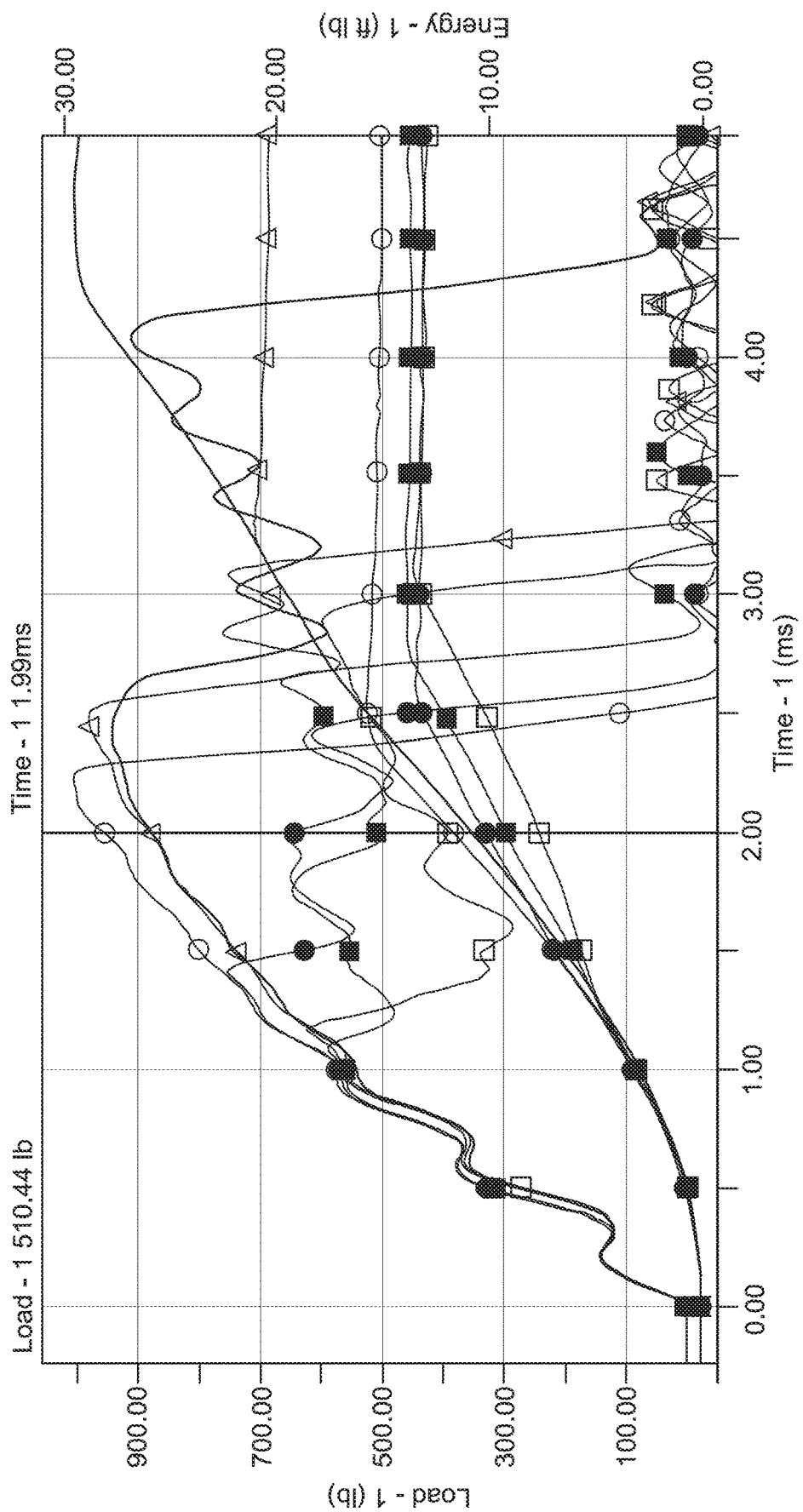
FIG. 1 shows the relationship of the load as a function of time as well as the energy as a function of time for the current commercial offering.

Foamed compositions are typically very versatile and have a broad spectrum of applicable uses. To meet such varied needs, foamed compositions should provide a basic durability. Imparting improved resilience and flame retardance to foamed polycarbonate compositions can further expand the versatility and use of these articles. The inclusion of a polysiloxane-polycarbonate copolymer can contribute to achieving improved polycarbonate foamed compositions. In some aspects, adding a polysiloxane-polycarbonate copolymer, rather than an acrylic modifier copolymer, to a polycarbonate admixture can provide a stronger foamed polycarbonate composition. As briefly described above, the present disclosure thus relates to foamed thermoplastic compositions comprising a polycarbonate base resin, a polysiloxane-polycarbonate copolymer component, and a flame retardant component as well as additives such as fillers, stabilizers, and antioxidants. In a further aspect, the present disclosure provides for filled foamed thermoplastic compositions exhibiting increased multi-axial impact resistance, ductility, and flame retardance.

In various aspects, the thermoplastic compositions formed can be processed with a foaming agent to produce articles of improved multi-axial strength, ductility, and flame retardance. Accordingly, the use of the disclosed compositions can be appropriate for foamed articles, such as those required for structural resilience or for fire susceptible environments.

In some aspects, the thermoplastic compositions disclosed herein can be used to prepare foamed articles. In further aspects, these articles can comprise the components of the disclosed compositions. As an example, the articles of the present disclosure can comprise from about 80 wt. % to about 95 wt. % of a polycarbonate resin, wherein the polycarbonate base resin comprises a mixture of a first polycarbonate and a second polycarbonate. In further aspects, the polycarbonate base resin can comprise a bisphenol A derivative. The disclosed foamed thermoplastic composition can further comprise from about 3 wt. % to about 16 wt. % of a polysiloxane-polycarbonate copolymer, from about 0.01 wt. % to about 1 wt. % of a non-bromine flame retardant, from about 0.1 wt. % to about 10 wt. % of filler. The filler component can be organic or non-organic, but can also impart a reinforcing aspect to the composition. In further aspects, the foamed thermoplastic composition can comprise from about 0.01 wt. % to about 1 wt. % of a mold release agent and from about 0.01 wt. % to about 1 wt. % of an anti-drip agent, wherein the combined weight percent value of all components does not exceed 100 wt. % and wherein all weight percent values are based on the total weight of the composition.

In further aspects, the present disclosure provides foamed articles that can comprise from about 80 wt. % to about 95 wt. % of a polycarbonate base resin, from about 3 wt. % to about 16 wt. % of a polysiloxane-polycarbonate copolymer, and from about 0.01 wt. % to about 1 wt. % of a non-bromine flame retardant additive. As an example, one or more thermoplastic compositions can be processed with blowing agents to provide the foamed articles. These foamed articles can exhibit improved mechanical properties, including improved multi-axial impact strength and flame retardance. In an aspect, the foamed article can exhibit an average multi-axial (MAX) load of at least about 1125 lb (e.g., 510 kg) to about 1200 lb (e.g., 544 kg) as measured according to ASTM D3763 (2014). Additionally, the foamed articles can also exhibit an energy to MAX load of at least about 20 ft-lbf (e.g., 27.1 Newton meters (Nm); 27.1 Joules) to about 40 ft-lbf (e.g., 54.2 Nm; 54.2 Joules) measured according to ASTM D3763 (2014). The foamed articles can also exhibit flame retardant properties. In various aspects, the foamed articles can exhibit a V0 rating at 3 mm measured according to UL 94 or a 5VA rating at 6 mm measured according to UL 94 (2013).

Before the present methods and systems are disclosed and described, it is to be understood that the methods and systems are not limited to specific components or to particular compositions. It is also to be understood that the terminology used herein is for the purpose of describing particular embodiments only and is not intended to be limiting.

Polycarbonate Base Resin

In various aspects, the thermoplastic composition of the present disclosure can comprise a polycarbonate base resin. For example, the disclosed thermoplastic compositions can comprise a polycarbonate base resin wherein the polycarbonate includes a polymer or copolymer or a mixture of polycarbonate polymers. The terms "polycarbonate" or "polycarbonates" as used herein include copolycarbonates, homopolycarbonates and (co)polyester carbonates. Suitable aromatic thermoplastic polymers can include aromatic polycarbonate, polyphenylene ether, aromatic polyester, polyphenylene ether/styrene blend, aromatic polyamide, polyethylene terephthalate, blends thereof, or a combination comprising at least one of the foregoing polymers.

In an aspect, the term "polycarbonate" is intended to refer to compositions having repeating structural carbonate units of formula (1):

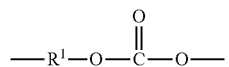

(1)

in which at least 60 percent of the total number of $R^1$ groups contain aromatic moieties and the balance thereof are aliphatic, alicyclic, or aromatic. Each $R^1$ is a $C_{6-30}$ aromatic group, that is, contains at least one aromatic moiety. $R^1$ can be derived from a dihydroxy compound of the formula HO—$R^1$—OH, in particular of formula (2):

wherein each of $A^1$ and $A^2$ is a monocyclic divalent aromatic group and $Y^1$ is a single bond or a bridging group having one or more atoms that separate $A^1$ from $A^2$. In an aspect, one atom separates $A^1$ from $A^2$. Specifically, each $R^1$ can be derived from a dihydroxy aromatic compound of formula (3):

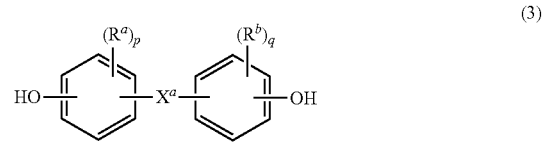

(3)

wherein $R^a$ and $R^b$ are each independently a halogen, $C_{1-12}$ alkoxy, or $C_{1-12}$ alkyl; and p and q are each independently integers of 0 to 4. It will be understood that $R^a$ is hydrogen when p is 0, and likewise $R^b$ is hydrogen when q is 0.

In various aspects, the polycarbonate base resin can comprise a bisphenol polycarbonate mixture. Examples of types of bisphenol compounds that can be represented by formula (3) include the bis(hydroxyaryl)alkane series such as, 1,1-bis(4-hydroxyphenyl)methane; 1,1-bis(4-hydroxyphenyl)ethane, 2,2-bis(4-hydroxyphenyl)propane (or bisphenol A); 2,2-bis(3,5-dibromo-4-hydroxyphenyl)propane; 2,2-bis(3,5-dimethyl-4-hydroxyphenyl)propane, 2,2-bis(4-hydroxyphenyl)butane; 2,2-bis(4-hydroxyphenyl)octane; 1,1-bis(4-hydroxyphenyl)propane; 1,1-bis(4-hydroxyphenyl)n-butane; bis(4-hydroxyphenyl)phenylmethane; 2,2-bis(4-hydroxy-1-methylphenyl)propane; 1,1-bis(4-hydroxy-t-butylphenyl)propane; 2,2-bis(4-hydroxy-3-bromophenyl)propane; 1,1-bis(4-hydroxyphenyl)decane; 4,4-dihydroxydiphenyl ether; 4,4-thiodiphenol; 4,4-dihydroxy-3,3-dichlorodiphenyl ether; 4,4-dihydroxy-2,5-dihydroxydiphenyl ether; or the like; bis(hydroxyaryl) cycloalkane series such as, 1,1-bis(4-hydroxyphenyl) cyclopentane; 1,1-bis(4-hydroxyphenyl)cyclohexane; 1,1-bis(3,5-dimethyl-4-hydroxyphenyl)cyclohexane; 1,1-bis(4-hydroxyphenyl)cyclododecane; 1,1-bis(3,5-dimethyl-4-hydroxyphenyl)cyclododecane; 1,1-bis-(4-hydroxyphenyl)-3,3,5-trimethylcyclohexane; or the like, or combinations comprising at least one of the foregoing bisphenol compounds.

Other examples of bisphenol compounds that can be represented by formula (3) include those where $X^a$ is —O—, —S—, —S(O)—, or —S(O)$_2$—, such as 4,4'-dihydroxy diphenylether, 4,4'-dihydroxy-3,3'-dimethylphenyl ether, or the like; bis(hydroxy diaryl)sulfides, such as 4,4'-dihydroxy diphenyl sulfide, 4,4'-dihydroxy-3,3'-dimethyl diphenyl sulfide, or the like; bis(hydroxy diaryl) sulfoxides, such as, 4,4'-dihydroxy diphenyl sulfoxides, 4,4'-dihydroxy-3,3'-dimethyl diphenyl sulfoxides, or the like; bis(hydroxy diaryl) sulfones, such as 4,4'-dihydroxy diphenyl sulfone, 4,4'-dihydroxy-3,3'-dimethyl diphenyl sulfone, or the like; or combinations comprising at least one of the foregoing bisphenol compounds.

Also in formula (3), $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group. In an aspect, the bridging group $X^a$ is single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. In one aspect, p and q is each 1, and $R^a$ and $R^b$ are each a $C_{1-3}$ alkyl group, specifically methyl, disposed meta to the hydroxy group on each arylene group.

Further to the description above, the term "polycarbonates" can refer to homopolycarbonates (wherein each $R^1$ in the polymer is the same), copolymers comprising different $R^1$ moieties in the carbonate ("copolycarbonates"), copolymers comprising carbonate units and other types of polymer units, such as ester units, and combinations comprising at least one of homopolycarbonates and/or copolycarbonates.

In various further aspects, the polycarbonate base resin can comprise a mixture of polycarbonates. For example, the polycarbonate base resin can comprise a mixture of a first polycarbonate and a second polycarbonate. The first polycarbonate can comprise a polycarbonate having a molecular weight of from about 20,000 Daltons to about 25,000 Daltons. As an example, the first polycarbonate can comprise a polycarbonate having an average molecular weight of about 21,600 Daltons. In some aspects, the disclosed thermoplastic composition can comprise the first polycarbonate in an amount from about 4 wt. % to about 10 wt. % of the total weight of the composition. The second polycarbonate can comprise a polycarbonate having a molecular weight of from about 34,000 Daltons to about 40,000 Daltons. For example, the second polycarbonate can comprise a polycarbonate having a molecular weight of about 35,500 Daltons. The thermoplastic composition can comprise from about 70 wt. % to about 90 wt. % of the second polycarbonate.

In an aspect, weight average molecular weight determinations of the polycarbonate base resin described herein can be performed according to polycarbonate standards. As an example, the molecular weight determinations can be performed using gel permeation chromatography (GPC), using a crosslinked styrene-divinylbenzene column and calibrated to polycarbonate references using an ultraviolet visible (UV-VIS) detector set at 264 nm. Samples can be prepared at a concentration of about 1 mg/ml, and eluted at a flow rate of about 1.0 ml/min.

Polysiloxane Polycarbonate Copolymer

In various aspects, the disclosed thermoplastic compositions can comprise a polycarbonate-polysiloxane copolymer component. As used herein, the term polycarbonate-polysiloxane copolymer is equivalent to polysiloxane-polycarbonate copolymer, polycarbonate-polysiloxane polymer, or polysiloxane-polycarbonate polymer. The polysiloxane-polycarbonate copolymer comprises polydiorganosiloxane blocks comprising structural units of the general formula (4) below:

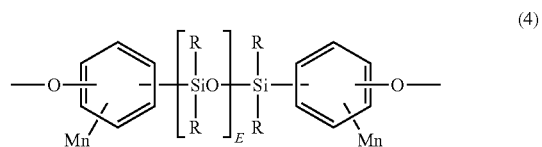

wherein the polydiorganosiloxane block length (E) is from about 20 to about 60; wherein each R group can be the same or different, and is selected from a $C_{1-13}$ monovalent organic group; wherein each M can be the same or different, and is selected from a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, and where each n is independently 0, 1, 2, 3, or 4.

In some aspects, two or more polysiloxane-polycarbonate copolymers can be used. For example, in some embodiments, blends of end-capped and hydroxy terminated materials may be used. In other embodiments, blends of similar chemistries having different proportions of siloxane may also be used.

In some aspects, the polysiloxane-polycarbonate copolymers can include those described by Chemical Abstract Service No. 202483-49-6 and 156064-99-2. In related embodiments, these two types of polysiloxane-polycarbonate copolymers may be present with respect to one another (i.e., CAS 202483-49-6 to CAS 156064-99-2) in a ratio ranging from about 1:1 to about 2:1. In some aspects, at least one of the polysiloxane-polycarbonate copolymers comprises siloxane in a range bounded at the lower end by a value of from about 2 wt. %, 4 wt. %, 6 wt. %, 8 wt. %, or 10 wt. % and at the upper end by a value of about 30 wt. %, to about 28 wt. %, to about 26 wt. %, to about 24 wt. %, 22 wt. %, 20 wt. %, 18 wt. %, 16 wt. %, 14 wt. %, 12 wt. %, or about 10 wt. %, relative to the total weight of the polysiloxane-polycarbonate copolymer. The siloxane groups may be arranged randomly or in block arrangement within the polysiloxane-polycarbonate copolymer.

The polysiloxane-polycarbonate copolymer also comprises polycarbonate blocks comprising structural units of the general formula (5) below:

wherein at least 60 percent of the total number of $R^1$ groups comprise aromatic moieties and the balance thereof comprise aliphatic, alicyclic, or aromatic moieties According to exemplary non-limiting aspects of the disclosure, the polycarbonate-polysiloxane block copolymer comprises diorganopolysiloxane blocks of the general formula (6) below:

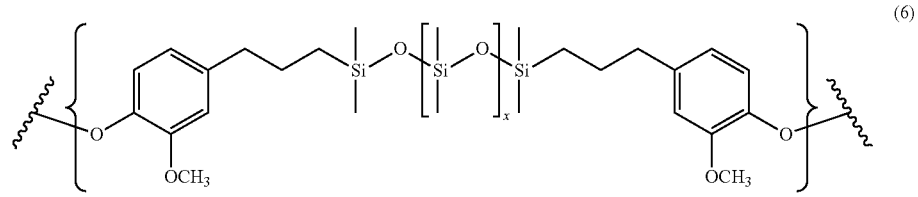

wherein x represents an integer from about 20 to about 60. The polycarbonate blocks according to these aspects can be derived from bisphenol-A monomers.

Diorganopolysiloxane blocks of formula (6) above can be derived from the corresponding dihydroxy compound of formula (7):

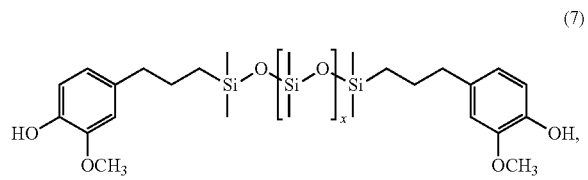

(7)

wherein x is as described above. Compounds of this type and others are further described in U.S. Pat. No. 4,746,701 to Kress, et al and U.S. Pat. No. 8,017,0697 to Carrillo. Compounds of this formula can be obtained by the reaction of the appropriate dihydroxyarylene compound with, for example, an alpha, omega-bisacetoxypolydiorangonosiloxane under phase transfer conditions.

Such dihydroxy polysiloxanes can be made by effecting a platinum catalyzed addition between a siloxane hydride of the formula (8):

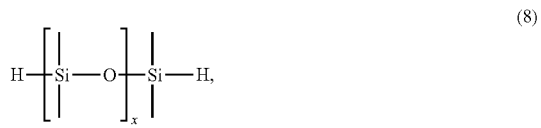

(8)

wherein x is a previously defined, and an aliphatically unsaturated monohydric phenol such as eugenol to yield a compound of formula (7).

Other copolymers or blends of copolymers can include those comprising polycarbonate (PC) and polydimethylsiloxane (PDMS), having a structure according to (9):

for example, the polycarbonate/polydimethylsiloxane content can be provided as a polysiloxane polycarbonate copolymer having a polysiloxane content in a range of from about 16 to about 24 wt. %.

In some of these aspects, the polycarbonate/polysiloxane copolymers can segregate into a domain structure, in which the polysiloxane domains are sized in a range of about 1 nm to about 5 nm, from about 5 nm to 10 nm, from about 10 nm to about 15 nm, from about 10 nm to about 15 nm, from about 15 nm to about 20 nm, from about 20 nm to about 25 nm, from about 25 nm to about 30 nm, 30 nm to 50 nm, from about 50 nm to about 100 nm, from about 100 nm to about 250 nm, from about 250 nm to about 500 nm, from about 500 nm to about 750 nm, from about 750 nm to about 1 micron, from about 1 micron to about 5 micron, from about 5 micron to about 10 micron, from about 10 micron to about 15 micron, from about 15 micron to about 20 micron, from about 20 micron to about 25 micron, from about 25 micron to about 30 micron or any combination thereof.

In various aspects, the polysiloxane polycarbonate copolymer can have a weight average molecular weight of 2,000 to 100,000 Daltons, specifically 5,000 to 50,000 Daltons as measured by gel permeation chromatography using a cross-linked styrene-divinyl benzene column, at a sample concentration of 1 milligram per milliliter, and as calibrated with polycarbonate standards.

Non-limiting examples of polysiloxane-polycarbonate copolymers can comprise various copolymers available from SABIC Innovative plastics. In an aspect, the polysiloxane-polycarbonate copolymer can contain a 6% by weight polysiloxane content based upon the total weight of the polysiloxane-polycarbonate copolymer. In various aspects, the 6% polysiloxane block copolymer can have a weight average molecular weight (Mw) of from about 23,000 to 24,000 Daltons using gel permeation chromatography with a bisphenol A polycarbonate absolute molecular weight standard. In certain aspects, the 6% weight siloxane polysiloxane-polycarbonate copolymer can have a melt volume flow rate (MVR) of about 10 cm³/10 min at 300° C./1.2 kg. In another example, the polysiloxane-polycarbonate

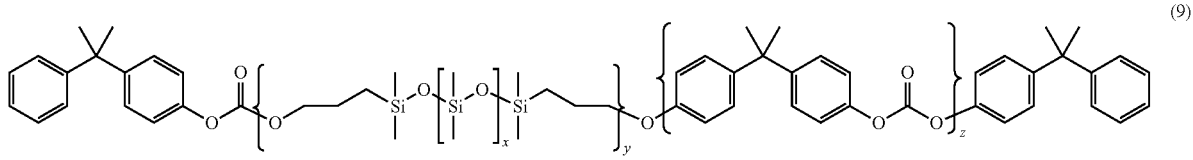

(9)

i.e., comprising polysiloxane polybisphenol A carbonate blocks.

In some aspects, the copolymers can comprise polysiloxane in a range of 2 to 30 wt. %, relative to the weight of the entire copolymer. In other aspects, the polysiloxane content in the copolymer or copolymer blend is in a range of from about 2 wt. % to about 4 wt. %, from about 4 wt. % to about 6 wt. %, from about 6 wt. % to about 8 wt. %, from about 8 wt. % to about 10 wt. %, from about 10 wt. % to about 12 wt. %, from about 12 wt. % to about 14 wt. %, from about 14 wt. % to about 16 wt. %, from about 16 wt. % to about 18 wt. %, from about 18 wt. % to about 20 wt. %, from about 20 wt. % to about 22 wt. %, from about 22 wt. % to about 24 wt. %, from about 24 wt. % to about 26 wt. %, from about 26 wt. % to about 28 wt. %, from about 28 wt. % to about 30 wt. %, or any combination thereof. In exemplary aspects, block can comprise 20% by weight polysiloxane based upon the total weight of the polysiloxane block copolymer. For example, an appropriate polysiloxane-polycarbonate copolymer can be a bisphenol A polysiloxane-polycarbonate copolymer endcapped with para-cumyl phenol (PCP) and having a 20% polysiloxane content (see C9030P). In various aspects, the weight average molecular weight of the 20% polysiloxane block copolymer can be about 29,900 Daltons to about 31,000 Daltons when tested according to a polycarbonate standard using gel permeation chromatography (GPC) on a cross-linked styrene-divinylbenzene column and calibrated to polycarbonate references using a UV-VIS detector set at 264 nm on 1 mg/ml samples eluted at a flow rate of about 1.0 ml/minute. Moreover, the 20% polysiloxane block copolymer can have an MVR at 300° C./1.2 kg of 7 cm³/10 min and can exhibit siloxane domains sized in a range of from about 5 micron to about 20 microns.

The disclosed polysiloxane-polycarbonate block copolymers can also be end-capped as similarly described in connection with the manufacture of polycarbonates set forth herein. For example, according to aspects of the disclosure, a polysiloxane-polycarbonate block copolymer can be end capped with para-cumyl phenol (see, for example, C9030P).

In various aspects, the polycarbonate-polysiloxane copolymer can be present in an amount from about 3 wt. % to about 16 wt. % of the total weight of the thermoplastic composition, including exemplary amounts of 5 wt. % and 15 wt. %.

Additives

As noted above, the disclosed thermoplastic composition can further comprise a flame retardant additive. In various aspects, the flame retardant additive can comprise a flame retardant material or mixture of flame retardant materials suitable for use in the inventive thermoplastic compositions. More specifically, the thermoplastic composition can comprise a non-bromine flame retardant additive. The flame retardant additive can be free of, or substantially free of, halogen, such as bromine. In various embodiments, the thermoplastic resin can comprise from about 0.01 wt. % to about 1 wt. % of a non-bromine flame retardant additive.

In an aspect, the flame retardant additive can comprise an alkali metal salt. For example, the flame retardant additive can comprise an alkali metal salt of perfluorinated alkyl sulfonates. The flame retardant can comprise an alkali metal salt of perfluorinated C1-C16 alkyl sulfonates such as potassium perfluorobutane sulfonate (Rimar salt), potassium perfluoroctane sulfonate, tetraethylammonium perfluorohexane sulfonate, potassium diphenylsulfone sulfonate (KSS), and the like, sodium benzene sulfonate, sodium toluene sulfonate (NATS) and the like; and salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. Rimar salt and KSS and NATS, alone or in combination with other flame retardants, are particularly useful in the compositions disclosed herein. In an aspect, the thermoplastic resin can comprise from about 0.01 wt. % to about 1 wt. % of potassium-4-(phenylsulfonyl) benzenesulfonate (KSS).

In further aspects, the flame retardant does not contain a halogen such as bromine or chlorine, and can comprise phosphorous. Non-brominated and non-chlorinated phosphorus-containing flame retardants can include, for example, organic phosphates and organic compounds containing phosphorus-nitrogen bonds. Exemplary di- or polyfunctional aromatic phosphorus-containing compounds include resorcinol tetraphenyl diphosphate (RDP), the bis(diphenyl) phosphate of hydroquinone and the bis(diphenyl) phosphate of bisphenol-A, respectively, their oligomeric and polymeric counterparts, and the like. Other exemplary phosphorus-containing flame retardant additives include phosphonitrilic chloride, phosphorus ester amides, phosphoric acid amides, phosphonic acid amides, phosphinic acid amides, tris(aziridinyl) phosphine oxide, polyorganophosphazenes, and polyorganophosphonates. In various aspects, the thermoplastic resin can comprise from about 0.01 wt. % to about 1 wt. % of a phosphorous containing flame retardant.

In still further aspects, the disclosed thermoplastic compositions can further comprise an additional filler, such as, for example, an inorganic filler or reinforcing agent. The specific composition of a filler, if present, can vary, provided that the filler is chemically compatible with the remaining components of the thermoplastic composition. In one aspect, the thermoplastic composition comprises a mineral filler. Exemplary fillers can comprise silicates and silica powders, such as aluminum silicate (mullite), synthetic calcium silicate, zirconium silicate, fused silica, crystalline silica graphite, natural silica sand, or the like; boron powders, such as boron-nitride powder, boron-silicate powders, or the like; oxides, such as $TiO_2$, aluminum oxide, magnesium oxide, or the like; calcium sulfate (as its anhydride, dihydrate or trihydrate), or the like; talc, including fibrous, modular, needle shaped, lamellar talc, or the like; wollastonite; surface-treated wollastonite; glass spheres such as hollow and solid glass spheres, silicate spheres, aluminosilicate, or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers), carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), aromatic polyamides, aromatic polyimides, polyetherimides, polytetrafluoroethylene, or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents. In various aspects, the thermoplastic composition can comprise from about 0.1 wt. % to about 10% of a filler.

More specifically, the thermoplastic composition can comprise a filler comprising glass fiber. In a further aspect, the glass fiber can have a cross section that is round or flat. In a yet further aspect, the glass fiber, for example, can be non-bonding fiberglass for Lexan, C912A. In an even further aspect, the glass bead can have a cross section that is round or flat. In some aspects, the thermoplastic composition can comprise a glass fiber filler in an amount of from about 0.1 wt. % to about 10 wt. % of the total weight of the composition, for example, 5 wt. %.

As disclosed herein, the thermoplastic composition can comprise a mold release agent. Exemplary mold releasing agents include for example, metal stearate, stearyl stearate, pentaerythritol tetrastearate, beeswax, montan wax, paraffin wax, or the like, or combinations including at least one of the foregoing mold release agents. Mold releasing agents are generally used in amounts of from about 0.1 to about 1.0 parts by weight, based on 100 parts by weight of the total composition, excluding any filler. In an aspect, the thermoplastic composition can comprise pentaerythritol tetrastearate to facilitate the mold release ability of the composition.

In various further aspects, the thermoplastic compositions can comprise a colorant, such as a pigment or a dye. Suitable colorants can include, for example titanium dioxide, anthraquinones, perylenes, perinones, indanthrones, quinacridones, xanthenes, oxazines, oxazolines, thioxanthenes, indigoids, thioindigoids, naphthalimides, cyanines, xanthenes, methines, lactones, coumarins, bis-benzoxazolylthiophene (BBOT), napthalenetetracarboxylic derivatives, monoazo and disazo pigments, triarylmethanes, aminoketones, bis(styryl)biphenyl derivatives, and the like, as well as combinations including at least one of the foregoing colorants. Colorants can be generally used in amounts of from 0.1 to 5 parts by weight, based on 100 parts by weight of the total composition, excluding any filler. In some aspects, the thermoplastic composition can comprise a colorant in an amount from 0.001 wt. % to about 1.2 wt. % of the composition.

In an example, the thermoplastic composition can comprise a colorant comprising carbon black. The thermoplastic composition can contain carbon black in an amount from about 0.001 wt. % to about 1.2 wt. % carbon black. As an example, carbon black can be present in the composition at about 0.8 wt. % of the total weight of the composition.

In an aspect, the thermoplastic compositions can comprise fine ground carbon black as a pigment imparting a black color throughout the composition.

In addition to the polycarbonate base resin, the polysiloxane-polycarbonate copolymer, the non-bromine flame retardant, and the filler the disclosed thermoplastic compositions can comprise one or more additives conventionally used in the manufacture of molded thermoplastic parts. The proviso follows that the optional additives do not adversely affect the desired properties of the resulting composition. Mixtures of optional additives, comprising one or more additives, can also be used. Such additives may be mixed at a suitable time during the mixing of the components for forming the composite mixture. In an example, the disclosed composition optionally comprises one or more additional, plasticizers, stabilizers, anti-static agents, colorants, and/or antioxidants.

Exemplary heat stabilizers can include, for example, organo phosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations including at least one of the foregoing heat stabilizers. Heat stabilizers can be used in amounts of from 0.01 to 0.5 parts by weight based on 100 parts by weight of the total composition, excluding any filler.

Suitable antioxidants can include either a primary or a secondary antioxidant. For example, antioxidants include organophosphites such as tris(nonyl phenyl)phosphite, tris (2,4-di-t-butylphenyl)phosphite, bis(2,4-di-t-butylphenyl) pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations including at least one of the foregoing antioxidants. Antioxidants can be used in amounts of from 0.01 to 0.5 parts by weight, based on 100 parts by weight of the total composition, excluding any filler.

In some aspects, light stabilizers can be added to the thermoplastic composition of the present disclosure. Appropriate light stabilizers can include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone or the like or combinations including at least one of the foregoing light stabilizers. Light stabilizers are generally used in amounts of from about 0.1 to about 1.0 parts by weight, based on 100 parts by weight of the total composition, excluding any filler.

Exemplary plasticizers can include, for example, phthalic acid esters such as dioctyl-4,5-epoxy-hexahydrophthalate, tris-(octoxycarbonylethyl) isocyanurate, tristearin, epoxidized soybean oil or the like, or combinations including at least one of the foregoing plasticizers. Plasticizers are generally used in amounts of from about 0.5 to about 3.0 parts by weight, based on 100 parts by weight of the total composition, excluding any filler.

Exemplary antistatic agents can include, for example, glycerol monostearate, sodium stearyl sulfonate, sodium dodecylbenzenesulfonate or the like, or combinations of the foregoing antistatic agents. In one aspect, carbon fibers, carbon nanofibers, carbon nanotubes, carbon black, or any combination of the foregoing can be used in a polymeric resin containing chemical antistatic agents to render the composition electrostatically dissipative.

In various aspects, the thermoplastic compositions of the present disclosure can comprise an anti-drip agent. Exemplary anti-drip agents can comprise a fibril forming or non-fibril fluoropolymer such as polytetrafluoroethylene (PTFE). In an example, the anti-drip agent can be encapsulated within a rigid copolymer, such as for example styrene-acrylonitrile copolymer (SAN). Polytetrafluoroethylene encapsulated in styrene acrylonitrile (TSAN) can disperse more readily throughout a composition than neat PTFE. An exemplary TSAN can comprise 50 wt % PTFE and 50 wt % SAN, based on the total weight of the encapsulated fluoropolymer. The SAN can comprise, for example, 75 wt % styrene and 25 wt % acrylonitrile based on the total weight of the copolymer. Alternatively, the fluoropolymer can be pre-blended in some manner with a second polymer, such as for, example, an aromatic polycarbonate or SAN to form an agglomerated material for use as an anti-drip agent. Either method can be used to produce an encapsulated fluoropolymer. The anti-drip agent can be used in an amount of from about 0.1 wt. % to about 2 wt. % based on the total weight of the composition.

Exemplary mold releasing agents can include for example, metal stearate, stearyl stearate, pentaerythritol tetrastearate, beeswax, montan wax, paraffin wax, or the like, or combinations including at least one of the foregoing mold release agents. Mold releasing agents can be used in amounts of from about 0.1 to about 1.0 parts by weight, based on 100 parts by weight of the total composition, excluding any filler.

In further aspects, an ultraviolet absorber can be used in the disclosed compositions. Suitable ultraviolet (UV)

absorbers can include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3, 3-diphenylacryloyl)oxy]methyl]propane (UVINUL™ 3030); 2,2'-(1,4-phenylene) bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than 100 nanometers; or the like, or combinations including at least one of the foregoing UV absorbers. UV absorbers are generally used in amounts of from 0.01 to 3.0 parts by weight, based on 100 parts by weight of the total composition, excluding any filler.

Exemplary lubricants can include for example, fatty acid esters such as alkyl stearyl esters, e.g., methyl stearate or the like; mixtures of methyl stearate and hydrophilic and hydrophobic surfactants including polyethylene glycol polymers, polypropylene glycol polymers, and copolymers thereof e.g., methyl stearate and polyethylene-polypropylene glycol copolymers in a suitable solvent; or combinations including at least one of the foregoing lubricants. Lubricants are generally used in amounts of from about 0.1 to about 5 parts by weight, based on 100 parts by weight of the total composition, excluding any filler.

Furthermore, additives to improve flow and other properties can be added to the composition, such as low molecular weight hydrocarbon resins. These materials are also known as process aids. Particularly useful classes of low molecular weight hydrocarbon resins are those derived from petroleum $C_5$ to $C_9$ feedstock that are derived from unsaturated $C_5$ to $C_9$ monomers obtained from petroleum cracking. Non-limiting examples can include olefins, e.g. pentenes, hexenes, heptenes and the like; diolefins, e.g. pentadienes, hexadienes and the like; cyclic olefins and diolefins, e.g. cyclopentene, cyclopentadiene, cyclohexene, cyclohexadiene, methyl cyclopentadiene and the like; cyclic diolefin dienes, e.g., dicyclopentadiene, methylcyclopentadiene dimer and the like; and aromatic hydrocarbons, e.g. vinyltoluenes, indenes, methylindenes and the like. The resins can additionally be partially or fully hydrogenated.

Properties and Articles

In one aspect, the thermoplastic compositions described herein can be used to produce foamed articles having improved multi-axial impact strength. Moreover, these articles can exhibit improved flame resistant ability as well as ductility. The composition can be injection molded in the presence of a chemical foaming agent to provide a molded plaque of the newly foamed article.

In various aspects, to prepare a polymer foam, the thermoplastic composition can be processed with an appropriate blowing agent. Useful blowing agents can include for example, low boiling halohydrocarbons and those that generate carbon dioxide; blowing agents that are solid at room temperature and when heated to temperatures higher than their decomposition temperature, generate gases such as nitrogen, carbon dioxide, and ammonia gas, such as azodicarbonamide, metal salts of azodicarbonamide, 4,4' oxybis (benzenesulfonylhydrazide), sodium bicarbonate, ammonium carbonate, or the like, or combinations comprising at least one of the foregoing blowing agents. In various aspects, the selection of a suitable blowing agent can depend upon the processing conditions and type of polymer.

The thermoplastic compositions can be processed with a suitable blowing agent to provide a foamed article exhibiting improved mechanical properties such as an improved multi-axial impact strength and flame retardance. In an aspect, the foamed article can exhibit an average multi-axial (MAX) load of at least about 1125 lb to about 1200 lb as measured according to ASTM D3763. Additionally, the foamed articles can also exhibit an energy to MAX load of at least about 20 ft-lbf to about 40 ft-lbf measured according to ASTM D3763. The foamed articles can also exhibit flame retardant abilities. In various aspects, the foamed articles can exhibit a V0 rating at 3 mm measured according to UL 94 or a 5VA rating at 6 mm measured according to UL 94. The UL flame performance rating for the foamed articles can also exhibit a density reduction from the solid thermoplastic composition state to the foamed state of up to about 10% for a specimen of the foamed article at 3 mm thickness. For example, a 3 mm thick foamed article sample can exhibit a density reduction of about 5.8%. In a further aspect, a 6 mm thick foamed article sample can exhibit a density reduction of up to about 30%. As an example, a 6 mm thick foamed article sample can exhibit a reduction in density of about 25.6%. when compared to the solid state thermoplastic composition The effectiveness of the foamed composition can be assessed according to multi-axial strength testing. Here, the resilience of the material can be evaluated against loads at multiple directions.

The foamed thermoplastic compositions can be used in the manufacture of various end use articles and products. Articles that can be manufactured from the foamed thermoplastic compositions of the present disclosure can find extensive use in applications requiring high impact strength and flame performance. Appropriate uses can include, but are not limited to, parts related to load bearing structures packaging, and automotive applications. In an example, the foamed articles can be appropriate for insulation and impact cushioning in packaging electronics, appliances, furniture, and construction products; vehicle energy impact absorbers for interior and bumper cores, cycle helmets; shape retention moldings for construction and commercial products. In some aspects, the foamed articles can find further use as protective housings for a number of applications. For example, these articles can be used as small or handheld electrical device enclosures, machine housings, medical device enclosures, outdoor electrical power boxes, and, in some aspects, HVAC enclosures. In a further example, the foamed thermoplastic compositions exhibiting improved impact strength and flame resistance can be used in gasoline pump housings.

Methods

In an aspect, methods can comprise mixing the polycarbonate base resin and the polysiloxane-polycarbonate copolymer as well as any further additives. The mixture can be compounded for extrusion or processed through injection molding of articles. For example, the polycarbonate base resin, polysiloxane-polycarbonate copolymer, filler, and other components are first blended, in a high speed mixer or by hand mixing. The blend is then fed into the throat of a twin-screw extruder via a hopper. Alternatively, at least one of the components can be incorporated into the composition by feeding it directly into the extruder at the throat and/or downstream through a sidestuffer, or by being compounded into a masterbatch with a desired polymer and fed into the extruder. The extruder can generally be operated at a temperature higher than that necessary to cause the composition to flow. The temperatures used for melting can be between about 280° C. and about 300° C. and the blend has a residence time of around 30 seconds in the heated part along the screws. The extrudate can be immediately quenched in a water bath and pelletized. The pellets so prepared can be one-fourth inch long or less as desired. Such pellets can be used for subsequent molding, shaping, or forming.

EXAMPLES

Detailed embodiments of the present disclosure are disclosed herein; it is to be understood that the disclosed embodiments are merely exemplary of the disclosure that may be embodied in various forms. Therefore, specific structural and functional details disclosed herein are not to be interpreted as limits, but merely as a basis for teaching one skilled in the art to employ the present disclosure. The specific examples below will enable the disclosure to be better understood. However, they are given merely by way of guidance and do not imply any limitation.

The following examples are put forth so as to provide those of ordinary skill in the art with a complete disclosure and description of how the methods, devices, and systems disclosed and claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for.

General Materials and Methods

The compositions in the Examples below were prepared from the components described in Table 1.

TABLE 1

Components of the polycarbonate composition.

| Item | Description | Supplier |
|---|---|---|
| C017 | PCP 1300; BPA Polycarbonate; MW 21,600-22,200 | SABIC (LEXAN ™) |
| C023A | 100 Grade PCP; BPA Polycarbonate; MW 29,900-31,000 | SABIC (LEXAN ™) |
| C001DP | PC Resin 130 Grade with PCP endcapped; BPA Polycarbonate; MW 35,500-36,500 | SABIC (LEXAN ™) |
| C9030P | 20% Polycarbonate/Siloxane copolymer PCP endcapped; 29,900-31,000 | |
| G912A | Fiberglass | (LEXAN ™) |
| F002P | PC 105B: Bromine with PCP endcapped | |

TABLE 1-continued

Components of the polycarbonate composition.

| Item | Description | Supplier |
|---|---|---|
| F535 | Potassium diphenylsulfone sulfonate (KSS); flame retardant | SABIC |
| F8580 | Synthetic hydrocarbon, poly-alpha-olefin (PAO) | |
| F538 | Pentaerythritol tetrastearate (PETS); mold release additive | SABIC |
| F542 | Phosphite stabilizer | SABIC |
| F449 | Styrene acrylonitrile encapsulated poly(tetrafluoroethylene) (TSAN) | SABIC |
| F7570 | Acrylic impact modifier; Paraloid EXL-2335 modifier | |
| R206FG | Colorant; fine black ground | |

Table 2 presents the components of comparative and inventive samples. Based on the results of multi-axial impact testing of Samples 1 through 6 (S1-S6), Samples 7 through 9 (S7-S9) were prepared. The samples were prepared according to the formulations presented in Table 2. Components were combined and dried. The mixture was then melt extruded, pelletized, and dried to remove (e.g., eliminate) moisture. A suitable blowing agent was mixed with the dried pellets before melting and forming into a part for testing.

The synthetic hydrocarbon, poly-alpha-olefin (PAO) mold release agent used for Samples 1 through 6 was replaced with pentaerythritol tetrastearate (PETS) for Samples 7 through 9 because PETS proves much easier to use during manufacture. Samples 1 through 9 comprise a higher percentage of a higher molecular weight polycarbonate (C001DP) than the commercial offering. Furthermore, these samples S1-S9 do not contain a bromine flame retardant. Instead, a potassium containing alternative KSS was used. Samples 2 and 3 differ from S1 in that they contain an acrylic modifier (F7570) and tetrafluoroethylene styrene acrylonitrile (TSAN, F449). Sample 3 has a higher loading of acrylic modifier compared to Sample 2 (6 wt. % compared to 2 wt. %). Samples 4 through 6 comprise the polysiloxane-polycarbonate copolymer (C9030P). Samples 4 and 5 have no acrylic modifier, but differ according to the amount of polysiloxane-polycarbonate copolymer present (S4 has 5 wt. %, while S5 is increased threefold to 15 wt. %). Sample 6 comprises the acrylic modifier (F7570) and the polysiloxane-polycarbonate copolymer loading has been reduced to 11.25 wt. %. Samples 7 through 9 contain PETS as the mold release agent instead of the synthetic hydrocarbon PAO. Sample 8 comprises an acrylic impact modifier at a loading of 3 wt. % loading, while S7 and S9 have a loading of 0 wt. %. Samples 7 and 8 have no polysiloxane-polycarbonate copolymer, while Sample 9 has a loading of 5 wt. %.

TABLE 2

Formulation of samples.

| Component | Current Commercial Offering (CCO) | S1 | S2 | S3 | S4 | S5 | S6 | S7 | S8 | S9 |
|---|---|---|---|---|---|---|---|---|---|---|
| C017 | 41.62 | 5.00 | 5.00 | 5.00 | 5.00 | 5.00 | 5.00 | 5.00 | 5.00 | 5.03 |
| C023A | 50.87 | 0 | 0 | 0 | 0 | 0 | 0 | 0 | 0 | 0 |
| C001DP | 0 | 88.39 | 84.99 | 81.99 | 82.99 | 72.99 | 73.74 | 88.46 | 85.07 | 83.03 |
| C9030P | 0 | 0 | 0 | 0 | 5.00 | 15.00 | 11.25 | 0 | 0 | 5.00 |
| G912A | 5.03 | 5.03 | 5.03 | 5.03 | 5.03 | 5.03 | 5.03 | 5.03 | 5.03 | 5.03 |
| F002P | 0.93 | 0 | 0 | 0 | 0 | 0 | 0 | 0 | 0 | 0 |
| F535 | 0.37 | 0.37 | 0.37 | 0.37 | 0.37 | 0.37 | 0.37 | 0.37 | 0.37 | 0.37 |
| F8580 | 0.37 | 0.37 | 0.37 | 0.37 | 0.37 | 0.37 | 0.37 | 0 | 0 | 0 |
| F538 | 0 | 0 | 0 | 0 | 0 | 0 | 0 | 0.30 | 0.30 | 0.30 |
| F542 | 0 | 0.03 | 0.03 | 0.03 | 0.03 | 0.03 | 0.03 | 0.03 | 0.03 | 0.03 |
| F449 | 0 | 0 | 0.40 | 0.40 | 0.40 | 0.40 | 0.40 | 0 | 0.40 | 0.40 |
| F7570 | 0 | 0 | 3.00 | 6.00 | 0 | 0 | 3.00 | 0 | 3.00 | 0 |
| R206FG | 0.80 | 0.81 | 0.81 | 0.81 | 0.81 | 0.81 | 0.81 | 0.80 | 0.80 | 0.80 |
| Total | 100 | 100 | 100 | 100 | 100 | 100 | 100 | 100 | 100 | 100 |

Physical and mechanical properties were assessed according to the methods described herein.

Multi-axial impact strength assessments were performed according to ASTM D3763. According to this procedure, test specimens were prepared as square plaques at 5.5 inches by 5.5 inches cut from a molded 9 inches by 13 inches foamed plaque. The testing tup speed was maintained at 7.5 miles per hour while the tup diameter was 0.5 inches. For each sample, five to six parts were tested.

Table 3 presents the results for multi-axial impact strength and the energy to max load strength of all samples. Sample 4 (S4), having a 5 wt. % loading of the polysiloxane-polycarbonate copolymer, exhibited the highest multi-axial impact strength results as shown in Table 3 below. Indeed, the samples having the polysiloxane-polycarbonate copolymer, particularly those having a loading of 5% (Samples 4 and 9), exhibited an improved multi-axial strength. Sample 9 (S9) was prepared according to the same formulation as S4, but for the mold release agent. The increase in polysiloxane-polycarbonate copolymer in S5 to 15 wt. % appeared to decrease the multi-axial strength (1515 lb for S4 compared to 1282 lb for S5). The higher loading of polysiloxane-polycarbonate copolymer (11.25 wt. %) and acrylic impact modifier (3 wt. %) in S6 also appeared to moderately decrease the multi-axial impact strength compared to S4 (1403 lb compared to 1515 lb).

Where the acrylic modifier is used and the mold release agent is PAO, increasing the loading of acrylic impact modifier from 3 wt. % to 6 wt. % provided lower values for the multi-axial impact strength assessment. (See S2 and S3). Accordingly, for S7-S9 where the mold release agent is PETS, the acrylic impact modifier was not loaded higher than 3 wt. %. Of these samples, S9 had the highest multi-axial strength and comprises the polysiloxane copolymer at 5 wt. % and no acrylic impact modifier.

TABLE 3

Physical properties of samples.

| | MAX Load (lb) | | Energy to MAX Load (ft-lbf) | |
|---|---|---|---|---|
| | Average | Std. Dev. | Average | Std. Dev. |
| CCO | 829 | 169 | 11 | 5 |
| S1 | 1429 | 90 | 35.1 | 3 |
| S2 | 1451 | 74 | 37.1 | 3.1 |
| S3 | 1424 | 57 | 37 | 3.1 |
| S4 | 1515 | 23 | 39.4 | 1.4 |
| S5 | 1282 | 85 | 30.7 | 3.2 |
| S6 | 1403 | 42 | 36.2 | 1 |
| S7 | 950 | 231 | 24 | 6 |
| S8 | 1130 | 95 | 26 | 3 |
| S9 | 1162 | 109 | 27 | 5 |

Figure 2:
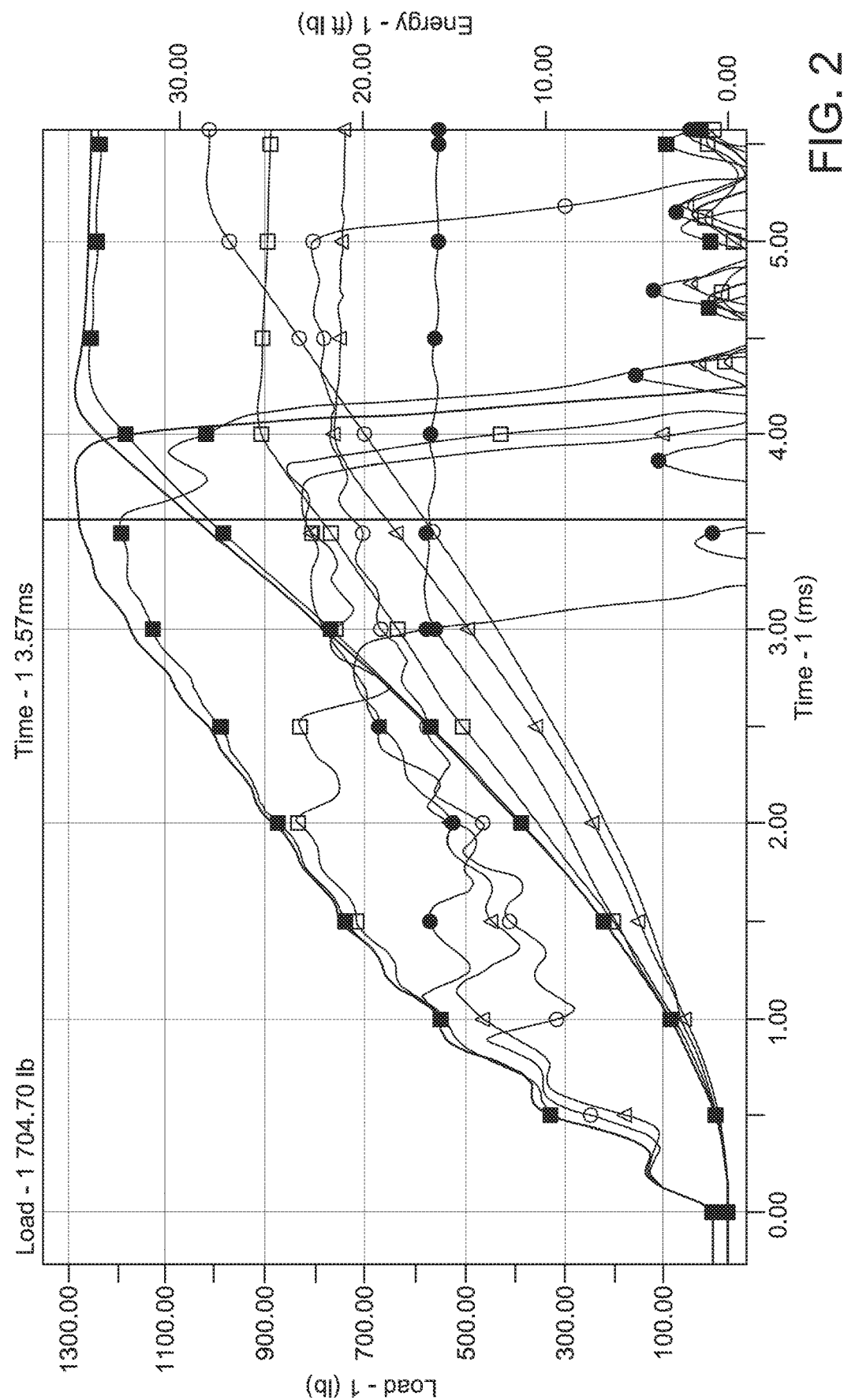
FIG. 2 shows the relationship of the load as a function of time as well as the energy as a function of time for Sample 7 (S7).
Figure 3:
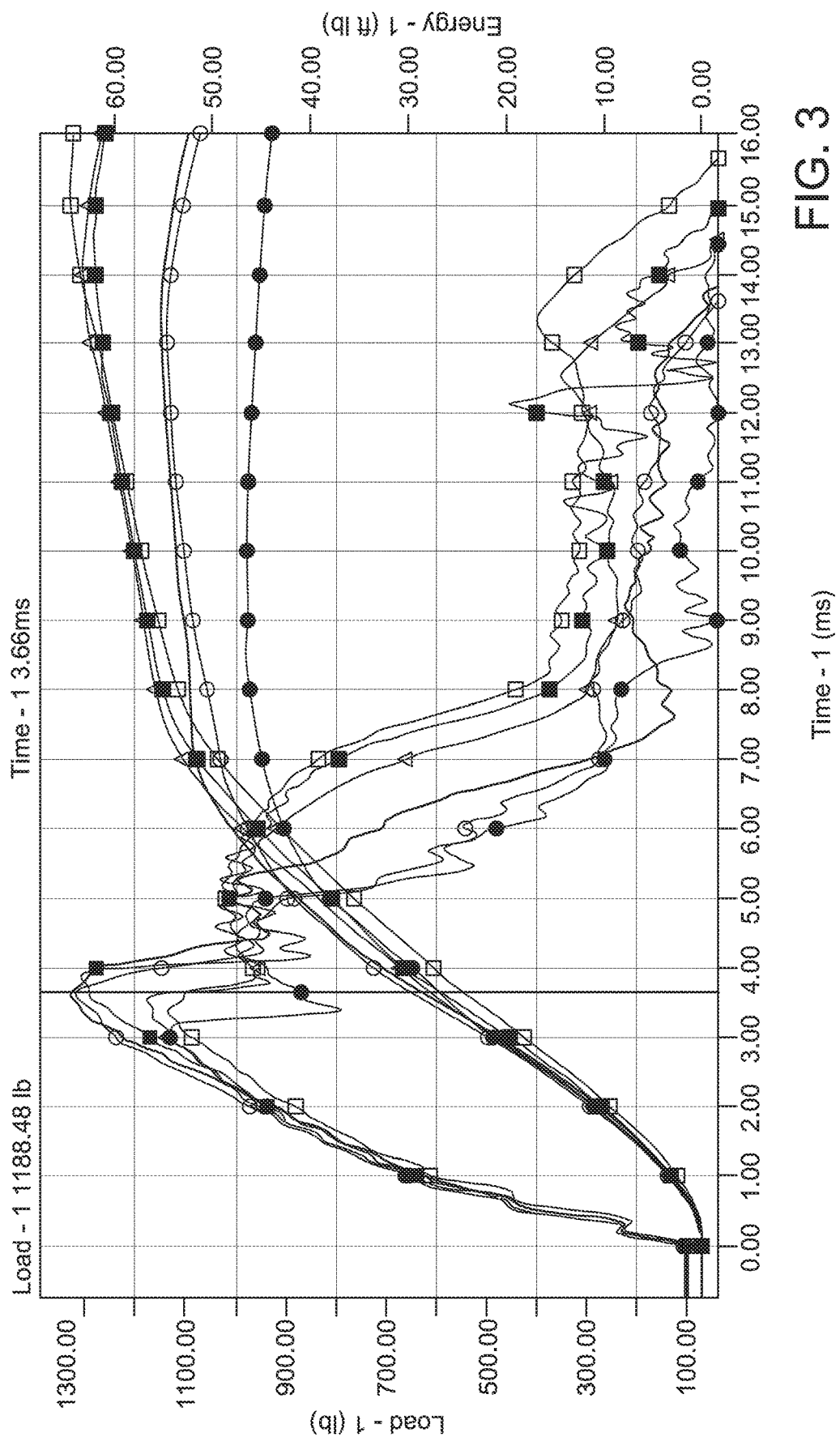
FIG. 3 shows the relationship of the load as a function of time as well as the energy as a function of time for Sample 8 (S8).
Figure 4:
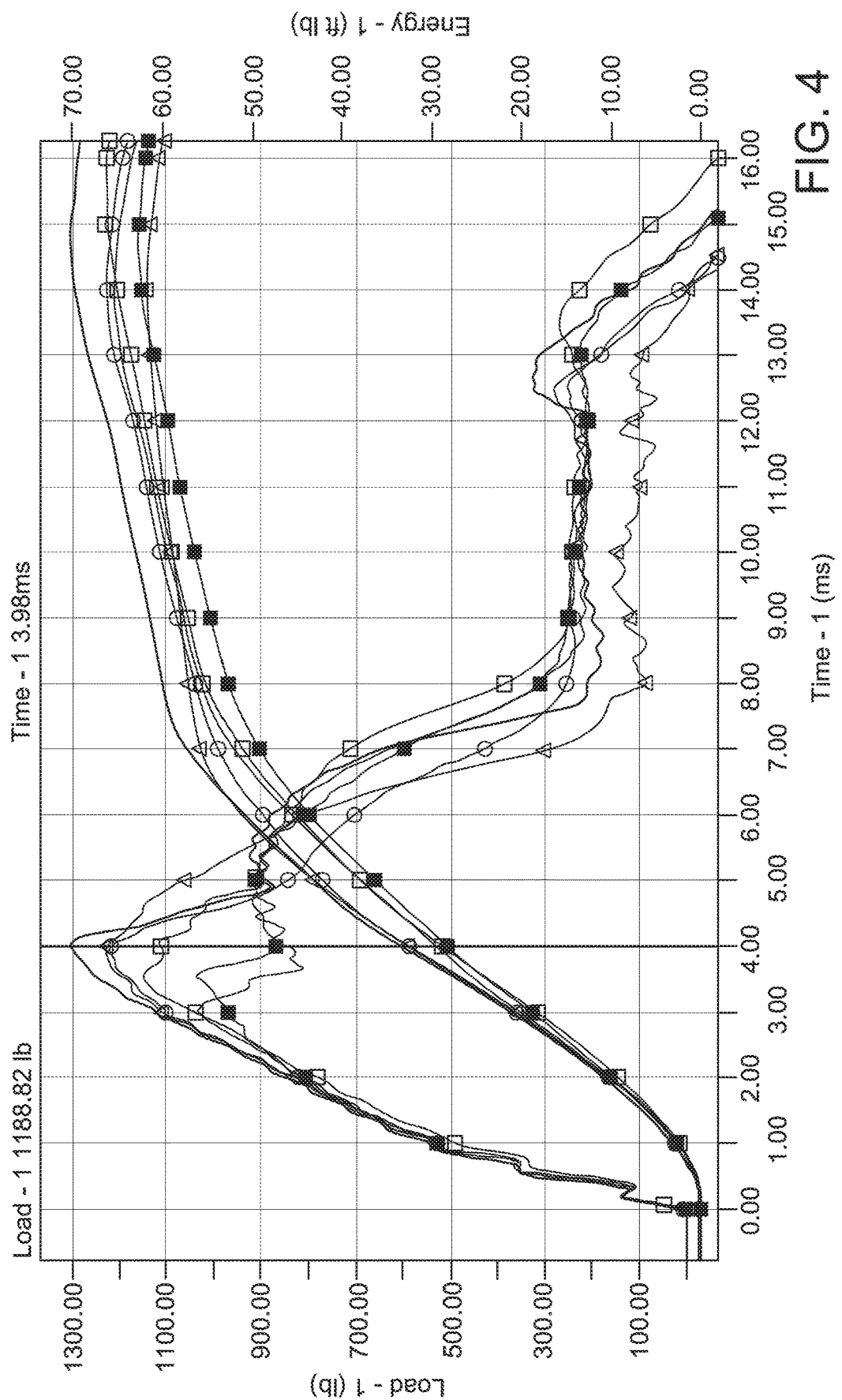
FIG. 4 shows the relationship of the load as a function of time as well as the energy as a function of time for Sample 9 (S9).

FIG. 1, FIG. 2, FIG. 3, and FIG. 4 illustrate the relationship of the load as a function of time as well as the energy as a function of time for each sample CCO, S7, S8, and S9, respectively. In FIGS. 1 and 2 (CCO and S7), the load curves rise and then fall precipitously. In FIGS. 3 and 4, corresponding to S8 and S9, the load curves rise, but do not fall precipitously. Samples S7, S8, and S9 exhibited the highest multi-axial strength values for specimens comprising PETS as the mold release agent, although S7 exhibited the lowest value of these three specimens.

Flammability tests were performed following the procedure of Underwriter's Laboratory Bulletin 94 entitled "Tests for Flammability of Plastic Materials, UL 94" (2013). Several ratings can be applied based on the rate of burning, time to extinguish, ability to resist dripping, and whether or not drips are burning. Specimens for testing were foamed bars comprising of the foamed thermoplastic composition. Each specimen had a thickness of either 3 mm or 6 mm. Materials can be classified according to this procedure as UL 94 HB (horizontal burn), V0, V1, V2, 5VA and/or 5VB on the basis of the test results obtained for five samples; however, the compositions herein were tested and classified only as V0, V1, and V2, the criteria for each of which are described below.

V0: In a sample placed so that its long axis is 180 degrees to the flame, the period of flaming and/or smoldering after removing the igniting flame does not exceed ten (10) seconds and the vertically placed sample produces no drips of burning particles that ignite absorbent cotton. Five bar flame out time is the flame out time for five bars, each lit twice, in which the sum of time to flame out for the first (t1) and second (t2) ignitions is less than or equal to a maximum flame out time (t1+t2) of 50 seconds.

V1: In a sample placed so that its long axis is 180 degrees to the flame, the period of flaming and/or smoldering after removing the igniting flame does not exceed thirty (30) seconds and the vertically placed sample produces no drips of burning particles that ignite absorbent cotton. Five bar flame out time is the flame out time for five bars, each lit twice, in which the sum of time to flame out for the first (t1) and second (t2) ignitions is less than or equal to a maximum flame out time (t1+t2) of 250 seconds.

V2: In a sample placed so that its long axis is 180 degrees to the flame, the average period of flaming and/or smoldering after removing the igniting flame does not exceed thirty (30) seconds, but the vertically placed samples produce drips of burning particles that ignite cotton. Five bar flame out time is the flame out time for five bars, each lit twice, in which the sum of time to flame out for the first (t1) and second (t2) ignitions is less than or equal to a maximum flame out time (t1+t2) of 250 seconds.

In certain aspects, the flame retardant compositions are of particular utility in the manufacture flame retardant articles that pass the UL94 vertical burn tests, in particular the UL94 5VB standard. In the UL94 vertical burn test, a flame is applied to a vertically fastened test specimen placed above a cotton wool pad. To achieve a rating of 5VB, burning must stop within 60 seconds after five applications of a flame to a test bar, and there can be no drips that ignite the pad. Various embodiments of the compositions described herein meet the UL94 5VB standard.

Table 4 presents the results for flame retardance of Sample 9 at a thickness of 3 mm and 6 mm. Sample 9 is the specimen exhibiting the highest multi-axial strength and comprising the mold release agent PETS. The solid state and foamed state densities are also present in Table 4.

TABLE 4

Flame retardance and densities of Sample 9.

| S9 Specimen Thickness (mm) | Density Solid State (kg/m$^3$) | Density Foamed State (kg/mg$^3$) | Density reduction (%) | UL 94 Rating |
|---|---|---|---|---|
| 3 | 1213.09 | 1142.62 | 5.8 | V0 |
| 6 | 1213.18 | 902.83 | 25.6 | 5VA |

In various aspects, the present disclosure pertains to and includes at least the following aspects.

Aspect 1. A foamed article comprising: from about 80 wt. % to about 95 wt. % of a polycarbonate base resin; wherein the polycarbonate base resin comprises a mixture of a first polycarbonate and a second polycarbonate; from about 3 wt. % to about 16 wt. % of a polysiloxane-polycarbonate copolymer; from about 0.01 wt. % to about 1 wt. % of a non-bromine flame retardant; from about 0.1 wt. % to about 10 wt. % of filler; and from about 0.01 wt. % to about 1 wt. % of a mold release agent, wherein the combined weight percent value of all components does not exceed 100 wt. % and wherein all weight percent values are based on the total weight of the composition.

Aspect 2. A foamed article comprising: from about 80 wt. % to about 95 wt. % of a polycarbonate base resin; wherein the polycarbonate base resin comprises a first polycarbonate and a second polycarbonate; from about 3 wt. % to about 16 wt. % of a polycarbonate polysiloxane copolymer; and from about 0.01 wt. % to about 1 wt. % of a non-bromine flame retardant; wherein the combined weight percent value of all components does not exceed 100 wt. % and wherein all weight percent values are based on the total weight of the composition.

Aspect 3. The foamed article of any of aspects 1-2, wherein the first polycarbonate comprises from about 4 wt. % to about 10 wt. % of the total weight of the composition and the second polycarbonate comprises from about 70 wt. % to about 90 wt. % of the total weight of the composition.

Aspect 4. The foamed article of any of aspects 1-3, wherein the first polycarbonate has a molecular weight of from about 20,000 Daltons to about 25,000 Daltons and the second polycarbonate has a molecular weight of from about 34,000 Daltons to about 40,000 Daltons Aspect 5. The foamed article of any of aspects 1-4, wherein the non-bromine flame retardant is potassium diphenylsulfone sulfonate.

Aspect 6. The foamed article of any of aspects 1-5, wherein the foamed article exhibits an average MAX load of at least about 1125 lb (e.g., 510 kg) to about 1200 lb (e.g., 544 kg) as measured according to ASTM D3763.

Aspect 7. The foamed article of any of aspects 1-6, wherein the foamed article exhibits an average energy to MAX load of at least about 20 ft-lbf (e.g., 27.1 Joules) to about 40 ft-lbf (e.g., 54.2 Joules) measured according to ASTM D3763.

Aspect 8. The foamed article of any of aspects 1-7, wherein the foamed article exhibits a V0 rating at 3 mm measured according to UL 94.

Aspect 10. The foamed article of any of aspects 1-9, wherein the foamed article exhibits a 5VA rating at 6 mm measured according to UL 94.

Aspect 11. The foamed article of any of aspects 1-10, wherein the foamed article exhibits a density reduction from a solid state of up to 10% at a thickness of 3 mm or a density reduction from a solid state of up to 30% at a thickness of 6 mm.

Aspect 12. A thermoplastic composition comprising: from about 80 wt. % to about 95 wt. % of polycarbonate base resin; from about 3 wt. % to about 16% of a polycarbonate polysiloxane copolymer; and from about 0.01 wt. % to about 1 wt. % of a non-bromine flame retardant additive, wherein the thermoplastic composition has an average multi-axial impact load of at least about 1125 lb to about 1200 lb as measured according to ASTM D3763, wherein the thermoplastic composition an average energy to multi-axial impact load of at least about 20 ft-lbf to about 40 ft-lbf measured according to ASTM D3763, and wherein the thermoplastic composition exhibits a V0 rating at 3 mm measured according to UL 94.

Aspect 13. The thermoplastic composition of aspect 12, wherein the polycarbonate base resin comprises a first polycarbonate and a second polycarbonate.

Aspect 13. The thermoplastic composition of aspect 13, wherein the first polycarbonate has a molecular weight of from about 20,000 Daltons to about 30,000 Daltons.

Aspect 15. The thermoplastic composition of aspect 13, wherein the first polycarbonate has a molecular weight of from about 20,000 Daltons to about 25,000 Daltons.

Aspect 16. The thermoplastic composition of aspect 13, wherein the second polycarbonate has a molecular weight of from about 34,000 Daltons to about 40,000 Daltons.

Aspect 17. The thermoplastic composition of any of aspects 12-16, wherein the thermoplastic composition further comprises a plasticizer, a filler, a stabilizer, an anti-static agent, an anti-drip agent, an impact modifier, a colorant, an antioxidant, a mold release agent, an ultraviolet absorber, a lubricant, or a blowing agent, or a combination thereof.

Aspect 18. The thermoplastic composition of any of aspects 12-17, wherein the thermoplastic composition further comprises a mold release additive comprising pentaerythritol tetrastearate present in an amount from about 0.01 wt. % to about 1 wt. %.

Aspect 19. The thermoplastic composition of any of aspects 12-18, wherein the thermoplastic composition further comprises an anti-drip agent comprising styrene acrylonitrile encapsulated polytetrafluoroethylene present in an amount from about 0.01 wt. % to about 1 wt. %.

Aspect 20. The thermoplastic composition of any of aspects 12-19, wherein the thermoplastic composition further comprises a stabilizer comprising tris(2,4-di-t-butylphenyl)phosphite present in an amount from about 0.01 wt. % to about 0.1 wt. %.

Aspect 21. The thermoplastic composition of aspect any of aspects 12-20, wherein the filler is fiberglass.

Aspect 22. A method comprising: forming a polycarbonate admixture comprising a polycarbonate base resin and a polysiloxane-polycarbonate copolymer, wherein the polycarbonate resin comprises a mixture of a first polycarbonate and a second polycarbonate; and combining the polycarbonate admixture with a blowing agent to provide a foamed composition, wherein the foamed composition has an average multi-axial impact load of at least about 1100 lb to about 1200 lb as measured according to ASTM D3763, wherein the foamed composition an average energy to multi-axial impact load of at least about 20 ft-lbf to about 40 ft-lbf measured according to ASTM D3763, and wherein the foamed composition exhibits a V0 rating at 3 mm measured according to UL 94.

Aspect 23. The method of aspect 19, further comprising adding to the polycarbonate admixture a stabilizer, an anti-static agent, a colorant, an antioxidant, a mold release agent, an anti-drip agent, an ultraviolet absorber, a lubricant, or a blowing agent, or a combination thereof.

Aspect 24. The method of any of claims 22-23, wherein the blowing agent comprises a halohydrocarbon, an azodicarbonamide, metal salts of azodicarbonamide, 4,4' oxybis (benzenesulfonylhydrazide), sodium bicarbonate, ammonium carbonate, or a suitable combination thereof.

Aspect 25. A foamed article consisting essentially of: from about 80 wt. % to about 95 wt. % of a polycarbonate base resin consisting essentially of from about 4 wt. % to about 10 wt. % of a first polycarbonate based on the total weight of the composition and from about 70 wt. % to about 90 wt. % of a second polycarbonate based on the total weight of the composition; from about 3 wt. % to about 16 wt. % of a polysiloxane-polycarbonate copolymer; from about 0.01 wt. % to about 1 wt. % of a non-bromine flame retardant; from about 0.1 wt. % to about 10 wt. % of filler; and from about 0.01 wt. % to about 1 wt. % of a mold release agent, wherein the combined weight percent value of all components does not exceed 100 wt. % and wherein all weight percent values are based on the total weight of the composition.

Aspect 26. A foamed article consisting essentially of: from about 80 wt. % to about 95 wt. % of a polycarbonate base resin consisting essentially of from about 4 wt. % to about 10 wt. % of a first polycarbonate based on the total weight of the composition and from about 70 wt. % to about 90 wt. % of a second polycarbonate based on the total weight of the composition; from about 3 wt. % to about 16 wt. % of a polysiloxane-polycarbonate copolymer; and about 0.01 wt. % to about 1 wt. % of a non-bromine flame retardant, wherein the combined weight percent value of all components does not exceed 100 wt. % and wherein all weight percent values are based on the total weight of the composition.

Aspect 27. A foamed article consisting of: from about 80 wt. % to about 95 wt. % of a polycarbonate base resin consisting of from about 4 wt. % to about 10 wt. % of a first polycarbonate based on the total weight of the composition and from about 70 wt. % to about 90 wt. % of a second polycarbonate based on the total weight of the composition; from about 3 wt. % to about 16 wt. % of a polysiloxane-polycarbonate copolymer; from about 0.01 wt. % to about 1 wt. % of a non-bromine flame retardant; from about 0.1 wt. % to about 10 wt. % of filler; and from about 0.01 wt. % to about 1 wt. % of a mold release agent, wherein the combined weight percent value of all components does not exceed 100 wt. % and wherein all weight percent values are based on the total weight of the composition.

Aspect 28. A foamed article consisting of: from about 80 wt. % to about 95 wt. % of a polycarbonate base resin consisting of from about 4 wt. % to about 10 wt. % of a first polycarbonate based on the total weight of the composition and from about 70 wt. % to about 90 wt. % of a second polycarbonate based on the total weight of the composition; from about 3 wt. % to about 16 wt. % of a polysiloxane-polycarbonate copolymer; and about 0.01 wt. % to about 1 wt. % of a non-bromine flame retardant, wherein the combined weight percent value of all components does not exceed 100 wt. % and wherein all weight percent values are based on the total weight of the composition.

Aspect 29. A thermoplastic composition comprising: from about 80 wt. % to about 95 wt. % of polycarbonate base resin; from about 3 wt. % to about 16% of a polycarbonate polysiloxane copolymer; and from about 0.01 wt. % to about 1 wt. % of a non-bromine flame retardant additive, wherein the thermoplastic composition has an average multi-axial impact load of at least 510 kg to 544 kg as measured according to ASTM D3763, wherein the thermoplastic composition an average energy to multi-axial impact load of at least 27 joules to 54 Joules measured according to ASTM D3763, and wherein the thermoplastic composition exhibits a V0 rating at 3 mm measured according to UL 94.

Aspect 30. A thermoplastic composition consisting essentially of: from about 80 wt. % to about 95 wt. % of polycarbonate base resin; from about 3 wt. % to about 16% of a polycarbonate polysiloxane copolymer; and from about 0.01 wt. % to about 1 wt. % of a non-bromine flame retardant additive, wherein the thermoplastic composition has an average multi-axial impact load of at least 510 kg to 544 kg as measured according to ASTM D3763, wherein the thermoplastic composition an average energy to multi-axial impact load of at least 27 joules to 54 Joules measured according to ASTM D3763, and wherein the thermoplastic composition exhibits a V0 rating at 3 mm measured according to UL 94.

Aspect 31. A thermoplastic composition consisting of: from about 80 wt. % to about 95 wt. % of polycarbonate base resin; from about 3 wt. % to about 16% of a polycarbonate polysiloxane copolymer; and from about 0.01 wt. % to about 1 wt. % of a non-bromine flame retardant additive, wherein the thermoplastic composition has an average multi-axial impact load of at least 510 kg to 544 kg as measured according to ASTM D3763, wherein the thermoplastic composition an average energy to multi-axial impact load of at least 27 joules to 54 Joules measured according to ASTM D3763, and wherein the thermoplastic composition exhibits a V0 rating at 3 mm measured according to UL 94.

While aspects of the present disclosure can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

It is also to be understood that the terminology used herein is for the purpose of describing particular aspects only and is not intended to be limiting. As used in the specification and in the claims, the term "comprising" may include the aspects "consisting of" and "consisting essentially of" Unless defined otherwise, all technical and scientific terms used herein have the same meaning as commonly understood by one of ordinary skill in the art to which this disclosure belongs. For example, the disclosure relates to articles such as foamed article comprising: from about 80 wt. % to about 95 wt. % of a polycarbonate base resin; wherein the polycarbonate base resin comprises a mixture of a first polycarbonate and a second polycarbonate; from about 3 wt. % to about 16 wt. % of a polysiloxane-polycarbonate copolymer; from about 0.01 wt. % to about 1 wt. % of a non-bromine flame retardant; from about 0.1 wt. % to about 10 wt. % of filler; and from about 0.01 wt. % to about 1 wt. % of a mold release agent, wherein the combined weight percent value of all components does not exceed 100 wt. % and wherein all weight percent values are based on the total weight of the composition. One of skill in the art will understand that the articles may consist essentially of: from about 80 wt. % to about 95 wt. % of a polycarbonate base resin; wherein the polycarbonate base resin comprises a mixture of a first polycarbonate and a second polycarbonate; from about 3 wt. % to about 16 wt. % of a polysiloxane-polycarbonate copolymer; from about 0.01 wt. % to about 1 wt. % of a non-bromine flame retardant; from about 0.1 wt. % to about 10 wt. % of filler; and from about 0.01 wt. % to about 1 wt. % of a mold release agent, wherein the combined weight percent value of all components does not exceed 100 wt. % and wherein all weight percent values are based on the total weight of the composition. One of skill in the art will understand that the article may consist of: from about 80 wt. % to about 95 wt. % of a polycarbonate base resin; wherein the polycarbonate base resin comprises a mixture of a first polycarbonate and a second polycarbonate; from about 3 wt. % to about 16 wt. % of a polysiloxane-polycarbonate copolymer; from about 0.01 wt. % to about 1 wt. % of a non-bromine flame retardant; from about 0.1 wt. % to about 10 wt. % of filler; and from about 0.01 wt. % to about 1 wt. % of a mold release agent, wherein the combined weight percent value of all components does not exceed 100 wt. % and wherein all weight percent values are based on the total weight of the composition. Likewise, the various articles and compositions supported herein that comprise certain elements may also consist essentially of or consist of the subject elements.

As used in the specification and the appended claims, the singular forms "a," "an" and "the" include plural referents unless the context clearly dictates otherwise. Thus, for example, reference to "a polycarbonate" includes mixtures of two or more such polycarbonates. Furthermore, for example, reference to a filler includes mixtures of two or more such fillers.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. A value modified by a term or terms, such as "about" and "substantially," is intended to include the degree of error associated with measurement of the particular quantity based upon the equipment available at the time of filing this application. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" mean that the subsequently described event, condition, component, or circumstance may or may not occur, and that the description includes instances where said event or circumstance occurs and instances where it does not.

Disclosed are component materials to be used to prepare disclosed compositions as well as the compositions themselves to be used within methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight, of a particular element or component in a composition or article denotes the weight relationship between the element or component and any other elements or components in the composition or article for which a part by weight is expressed. Thus, in a composition containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

Compounds disclosed herein are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this disclosure belongs.

As used herein, the terms "number average molecular weight" or "Mn" can be used interchangeably, and refer to the statistical average molecular weight of all the polymer chains in the sample and is defined by the formula:

$$Mn = \frac{\Sigma N_i M_i}{\Sigma N_i},$$

where $M_i$ is the molecular weight of a chain and $N_i$ is the number of chains of that molecular weight. Mn can be determined for polymers, such as polycarbonate polymers or polycarbonate-PMMA copolymers, by methods well known to a person having ordinary skill in the art.

As used herein, the terms "weight average molecular weight" or "Mw" can be used interchangeably, and are defined by the formula:

$$Mw = \frac{\Sigma N_i M_i^2}{\Sigma N_i M_i},$$

where Mi is the molecular weight of a chain and Ni is the number of chains of that molecular weight. Compared to Mn, Mw takes into account the molecular weight of a given chain in determining contributions to the molecular weight average. Thus, the greater the molecular weight of a given chain, the more the chain contributes to the Mw. It is to be understood that as used herein, Mw is measured by gel permeation chromatography. In some cases, Mw is measured by gel permeation chromatography and calibrated with polycarbonate standards.

What is claimed is:

1. A foamed article comprising:
    from about 80 wt. % to about 95 wt. % of a polycarbonate base resin, wherein the polycarbonate base resin comprises a first polycarbonate and a second polycarbonate, wherein the first polycarbonate comprises from about 4 wt. % to about 10 wt. % of the total weight of the composition and the second polycarbonate comprises from about 70 wt. % to about 90 wt. % of the total weight of the composition, and wherein the first polycarbonate has a molecular weight of from about 20,000 Daltons to about 25,000 Daltons and the second polycarbonate has a molecular weight of from about 34,000 Daltons to about 40,000 Daltons according to polycarbonate standards;
    from about 3 wt. % to about 16 wt. % of a polysiloxane-polycarbonate copolymer;
    from 0.01 wt. % to 1 wt. % of a non-bromine flame retardant comprising an alkali metal salt;
    from about 0.1 wt. % to about 10 wt. % of filler; and
    from about 0.01 wt. % to about 1 wt. % of a mold release agent,
    wherein
       the foamed article exhibits a V0 rating at 3 mm measured according to UL 94,
       the combined weight percent value of all components does not exceed 100 wt, and
       all weight percent values are based on the total weight of the composition.

2. The foamed article of claim 1, wherein the non-bromine flame retardant is potassium diphenylsulfone sulfonate.

3. The foamed article of claim 1, wherein the foamed article exhibits an average MAX load of at least about 1125 lb to about 1200 lb as measured according to ASTM D3763.

4. The foamed article of claim 1, wherein the foamed article exhibits an average energy to MAX load of at least about 20 ft-lbf to about 40 ft-lbf measured according to ASTM D3763.

5. The foamed article of claim 1, wherein the foamed article exhibits a 5VA rating at 6 mm measured according to UL 94.

6. The foamed article of claim 1, wherein the foamed article exhibits a density reduction from a solid state of up to 10% at a thickness of 3 mm or a density reduction from a solid state of up to 30% at a thickness of 6 mm.

* * * * *